(12) United States Patent
Srinivasamurthy et al.

(10) Patent No.: US 11,889,101 B2
(45) Date of Patent: Jan. 30, 2024

(54) METHODS AND SYSTEMS FOR USING MOTION ESTIMATION REGIONS IN ENCODING PICTURES ASSOCIATED WITH VIDEO DATA

(71) Applicant: Texas Instruments Incorporated, Dallas, TX (US)

(72) Inventors: Naveen Srinivasamurthy, Bengaluru (IN); Soyeb Nagori, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/814,656

(22) Filed: Mar. 10, 2020

(65) Prior Publication Data
US 2021/0006820 A1    Jan. 7, 2021

Related U.S. Application Data

(63) Continuation of application No. 15/966,792, filed on Apr. 30, 2018, now Pat. No. 10,616,600, which is a (Continued)

(30) Foreign Application Priority Data

Feb. 10, 2012    (IN) .............................. 505/CHE/2012

(51) Int. Cl.
*H04N 19/119*    (2014.01)
*H04N 19/52*    (2014.01)
(Continued)

(52) U.S. Cl.
CPC ........... *H04N 19/52* (2014.11); *H04N 19/119* (2014.11); *H04N 19/122* (2014.11); *H04N 19/15* (2014.11); *H04N 19/174* (2014.11); *H04N 19/96* (2014.11)

(58) Field of Classification Search
CPC ..... H04N 19/52; H04N 19/119; H04N 19/122
See application file for complete search history.

(56) References Cited

U.S. PATENT DOCUMENTS

| 9,008,450 | B1 * | 4/2015 | Choudhary | .......... | H04N 19/523 |
| | | | | | 375/240.16 |
| 2011/0075736 | A1 * | 3/2011 | Endo | ...................... | H04N 5/144 |
| | | | | | 375/E7.125 |

(Continued)

OTHER PUBLICATIONS

Zhibo Chen et al. (Fast integer-pel and fractional-pel motion estimation for H.264/AVC;—vol. 17, Issue 2, Apr. 2006, pp. 264-290) (Year: 2006).*

*Primary Examiner* — Dave Czekaj
*Assistant Examiner* — Berteau Joisil
(74) *Attorney, Agent, or Firm* — Carl G. Peterson; Frank D. Cimino

(57) ABSTRACT

A method comprises dividing a largest coding unit (LCU) of a picture into a plurality of motion estimation regions (MERs) having size equal to or less than a predetermined size. For one or more MERs of the plurality of MERs, a number of first motion searches are performed for determining a first quad-tree based on a cost function associated with a first plurality of prediction units (PUs) of the one or more MERs. A number of second motion searches are performed for the LCU, for determining a second quad-tree, based on the cost function associated with a second plurality of PUs of the LCU. The first quad-tree or the second quad-tree is selected for performing encoding of the picture based on a comparison of a first cost of the first quad-tree with a second cost of the second quad-tree.

20 Claims, 5 Drawing Sheets

Related U.S. Application Data continuation of application No. 15/401,807, filed on Jan. 9, 2017, now Pat. No. 9,961,361, which is a continuation of application No. 13/762,953, filed on Feb. 8, 2013, now Pat. No. 9,544,592.

(51) Int. Cl.
*H04N 19/15* (2014.01)
*H04N 19/174* (2014.01)
*H04N 19/122* (2014.01)
*H04N 19/96* (2014.01)

(56) References Cited

U.S. PATENT DOCUMENTS

2011/0286523 A1* 11/2011 Dencher ............. H04N 19/176
　　　　　　　　　　　　　　　　　　　375/E7.1
2013/0114727 A1* 5/2013 Sato ...................... H04N 19/61
　　　　　　　　　　　　　　　　　　　375/240.16
2014/0105295 A1 4/2014 Shiodera et al.
2014/0301461 A1 10/2014 Jeon et al.

* cited by examiner

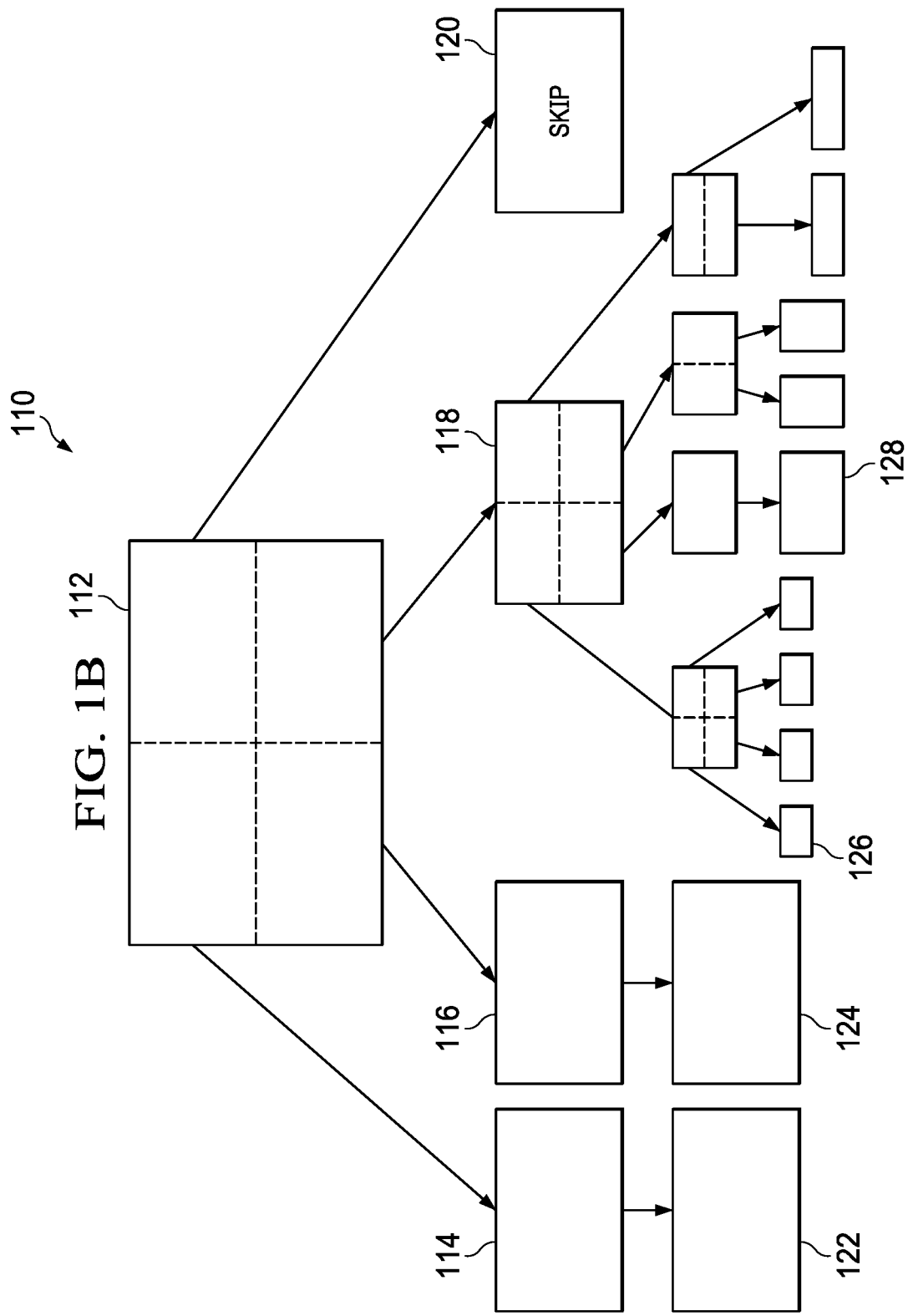

METHODS AND SYSTEMS FOR USING MOTION ESTIMATION REGIONS IN ENCODING PICTURES ASSOCIATED WITH VIDEO DATA

CROSS REFERENCE TO RELATED APPLICATIONS

This application is a continuation of U.S. patent application Ser. No. 15/966,792, filed Apr. 30, 2018, which is a continuation of U.S. patent application Ser. No. 15/401,807, filed Jan. 9, 2017, now U.S. Pat. No. 9,961,361, which is a continuation of U.S. patent application Ser. No. 13/762,953, filed Feb. 8, 2013, now U.S. Pat. No. 9,544,592, which claims foreign priority to Indian patent application number 505/CHE/2012, filed on Feb. 10, 2012, in the Indian Patent Office, all of which are incorporated herein by reference in their entirety.

TECHNICAL FIELD

The present disclosure generally relates to the field of encoding of video data.

BACKGROUND

Pursuant to an exemplary scenario, multimedia data captured by media capture devices, such as a camera or a camcorder, may be compressed in order to save memory during storage or to efficiently utilize available bandwidth during a transmission. The multimedia data, such as, for example, video data, may be encoded utilizing encoding mechanisms that are sufficient to achieve compression of the video data. The video data may subsequently be decompressed (e.g., decoded) for display/viewing purposes.

Moreover, in one exemplary scenario, various video coding paradigms may involve a block-based coding of video data, wherein each frame of video data is represented in terms of a plurality of blocks, and wherein coding techniques, such as, for example, motion compensation and transformation, are applied to the blocks so as to remove temporal and spatial redundancies in the frames corresponding to the video data. Pursuant to one exemplary scenario, high efficiency video coding (HEVC) may be implemented to substantially improve coding efficiency compared to H.264/Advanced Video Coding (AVC) (e.g., reducing bit rate requirements by half while maintaining comparable video quality), which might occur at the expense of increased computational and memory requirements. Depending on the application requirements, HEVC may be able to trade off computational complexity, compression rate, robustness to errors and processing delay time.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Various systems, methods, and computer-readable mediums for encoding pictures associated with a video data are disclosed. In an embodiment, a method includes dividing a largest coding unit (LCU) of the picture into a plurality of motion estimation regions (MERs), wherein size of each MER from among the plurality of MERs is equal to or less than a predetermined size. The method further includes performing, for one or more MERs of the plurality of MERs, a number of first motion searches for determining one or more first quad-trees. A first plurality of PUs is associated with the one or more MERs. The one or more first quad-trees are determined based on a cost function associated with the first plurality of PUs. Furthermore, the method includes performing, for the LCU, a number of second motion searches for determining a second quad-tree, the second quad-tree being determined based on the cost function associated with a second plurality of PUs of the LCU. The first quad-tree or the second quad-tree is selected so as to implement an encoding device to encode the picture based on a comparison of a first cost of the one or more quad-trees with a second cost of the second quad-tree, the first cost and the second cost being determined based on the cost function.

Additionally, in an embodiment, a system for encoding pictures associated with video data is provided. In an embodiment, the system includes a processing module and a memory module. The processing module is configured to divide a largest coding unit (LCU) of the picture into a plurality of motion estimation regions (MERs). Size of each MER from among the plurality of MERs is equal to or less than a predetermined size. The processing module is further configured to perform, for one or more MERs from among the plurality of MERs, a number of first motion searches so as to determine one or more first quad-trees. A first plurality of prediction units (PUs) is associated with the each of the one or more MERs. Each of the one or more first quad-trees is determined based on a cost function associated with the first plurality of PUs. Furthermore, the processing module is configured to perform, for the LCU, a number of second motion searches so as to determine a second quad-tree. A second plurality of PUs is associated with the LCU. The second quad-tree is determined based on a cost function associated with a second plurality of PUs. A quad-tree from the one or more first quad-trees or the second quad-tree is selected so as to implement an encoding device to encode the picture based on a comparison of a first cost of the one or more first quad-tree with a second cost of the second quad-tree. The first cost and the second cost are determined based on the cost function. The memory module is communicatively associated with the processing module and is configured to store a first candidate list generated based on the number of first motion searches and a second candidate list generated based on the number of second motion searches.

Moreover, in an embodiment, a non-transitory computer-readable medium is provided. The non-transitory computer-readable medium is configured to store a set of instructions that when executed cause a computer to perform a method for encoding pictures associated with video data. The method includes dividing a largest coding unit (LCU) of the picture into a plurality of motion estimation regions (MERs), wherein size of each MER from among the plurality of MERs is equal to or less than a predetermined size. The method further includes performing, for one or more MERs of the plurality of MERs, a number of first motion searches for determining one or more first quad-trees. A first plurality of PUs is associated with the one or more MERs. The one or more first quad-trees are determined based on a cost function associated with the first plurality of PUs. Furthermore, the method includes performing, for the LCU, a number of second motion searches for determining a second quad-tree, the second quad-tree being determined based on the cost function associated with a second plurality of PUs of the LCU. The first quad-tree or the second quad-tree is selected so as to implement an encoding device to encode the picture based on a comparison of a first cost of the one or more quad-trees with a second cost of the second quad-tree, the first cost and the second cost being determined based on the cost function.

Other aspects and example embodiments are provided in the drawings and the detailed description that follows.

BRIEF DESCRIPTION OF THE FIGURES

FIGS. 1A and 1B illustrate an exemplary picture and an exemplary partitioning of the picture, respectively in a video compression process, in accordance with an exemplary scenario;

DETAILED DESCRIPTION

Pursuant to an exemplary scenario, video coding paradigms such as H.264/Advanced Video Coding (AVC), High Efficiency Video Coding (HEVC) utilizes motion estimation mechanism for video compression. Pursuant to an exemplary scenario, HEVC is a video coding paradigm being developed by the Joint Collaborative Team on Video Coding (JCT-VC), a collaboration between ITU-T Video Coding Experts Group (VCEG) and ISO/IEC Moving Picture Experts Group (MPEG). HEVC aims to substantially improve coding efficiency compared to previous coding paradigms such as H.264/Advanced Video Coding (AVC). For example, HEVC aims to reduce bitrate requirements by half while maintaining a comparable video quality, in comparison to previous video coding standards, probably at an expense of increased computational and memory requirements. Depending on application requirements, HEVC may be able to trade off computational complexity, compression rate, robustness to errors and processing delay time involved in the video compression process in pictures. As used herein, the term picture may refer to a frame or a field of a frame. A frame is representative of an image captured during a particular interval of time.

Pursuant to an exemplary scenario, in HEVC a picture is partitioned into largest coding unit (LCUs), coding units (CUs), prediction units (PUs) and transform units (TUs) unlike into macro-blocks in video coding paradigms such as H.264/AVC, MPEG-4, and the like. An example of picture partitioning in HEVC is explained further in detail with reference to FIGS. 1A and 1B.

Figure 1A:
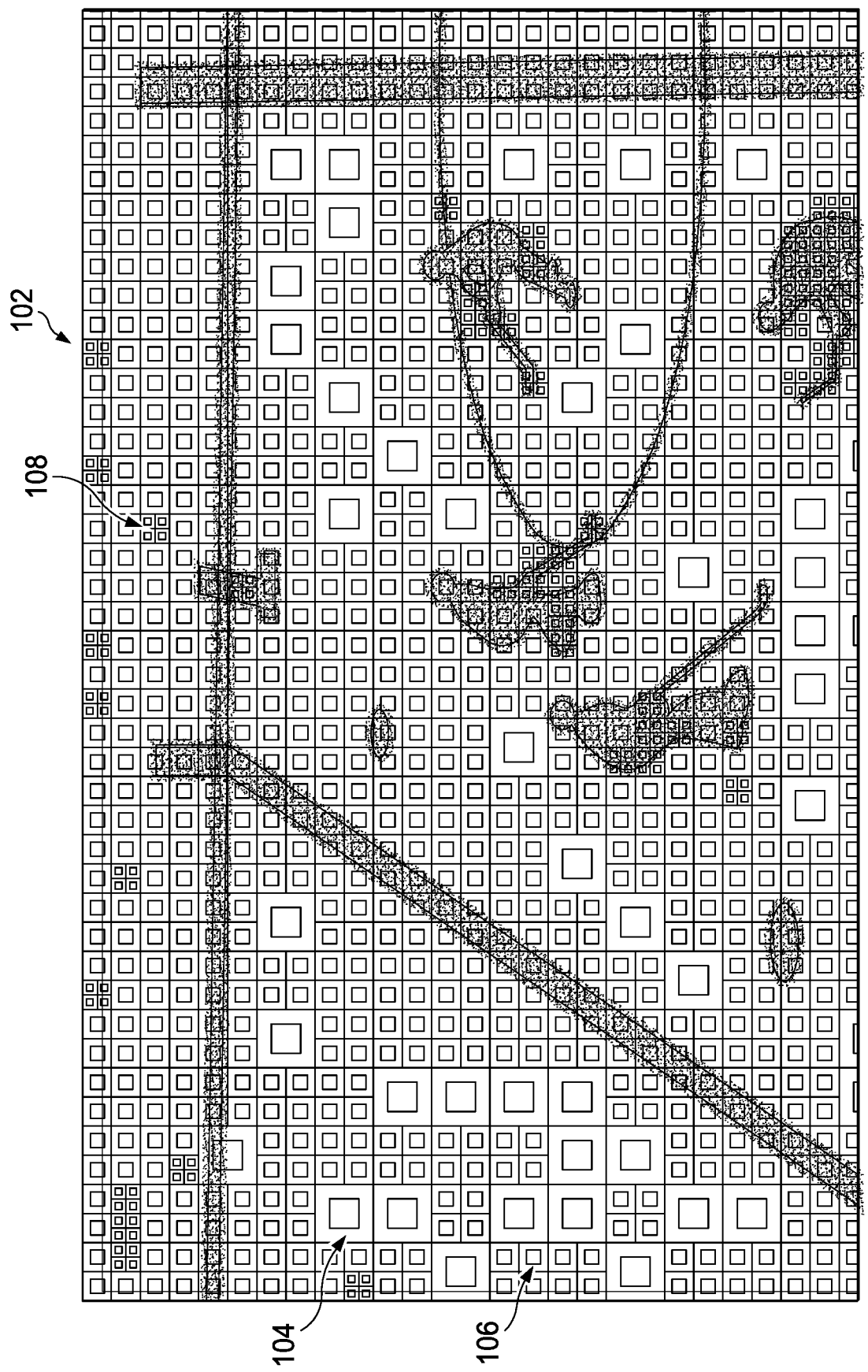

FIGS. 1A and 1B illustrate a picture and partitioning of the picture, respectively in a video compression process in accordance with a video coding standard, for example, HEVC standard. For example, FIG. 1A illustrates a picture 102 being partitioned into a sequence or tree-blocks. As used herein, the term tree-block may refer to an N×N block of luma samples together with the two corresponding N/2×N/2 blocks of chroma samples for a picture comprising three sample arrays, or an N×N block of samples of a monochrome picture for a picture coded using three separate color planes. The tree-block is broadly analogous to a macroblock (in previously known video coding paradigms such as H.264/AVC, MPEG-4, and the like), however, the tree-block concept enables more sophisticated and flexible partitioning of the picture when compared to the macro-block based picture partitioning. An example of the picture partitioning in the tree-block sequence is illustrated and explained with reference to FIGS. 1A and 1B. For example, FIG. 1 A illustrates an example of a picture 102 partitioned into a plurality of blocks of various sizes, such as a block of size 64×64 (block 104), 32×32 (block 106), 16×16 (block 108).

In HEVC standard, a parent node of tree block sequence comprises a largest coding block, for example a LCU. In other words, a picture is partitioned into non-overlapping LCUs. An LCU may further be partitioned into CUs. A CU is a block of pixels within the LCU, and is a basic unit of region-dividing utilized for inter/intra prediction. The CU is square and may take a size from 8×8 luma samples up to the maximum size of the tree-block (for example, 64×64). The concept of CU allows recursive dividing of the picture into four equally sized blocks, starting from the LCU. This process gives a content-adaptive coding tree structure comprising the CU blocks, each of which may be as large as the LCU or as small as 8×8. The CU can be further divided into PUs. In particular, each CU may contain one or more PUs. The PU is the basic unit used for carrying the information related to the prediction processes. The PU allows multiple different shapes to encode irregular shape patterns corresponding to boundaries of objects in the picture.

Besides CU and PU, TU is also defined to represent basic unit for transform coding and quantization in video compression. The size of TU cannot exceed that of CU, but is independent of the size of the PU. An example partitioning of a picture, for example the picture 102 in a tree-block sequence is illustrated in FIG. 1B. As illustrated, a tree-block, for example, tree-block 110 may comprise a LCU 112 as a base unit, a plurality of CUs such as CUs 114, 116, 118, 120, and a plurality of PUs such as PUs 122, 124, 126, 128 utilized for block based coding. It will be appreciated that various blocks of the tree-block 110 are shown herein as an example embodiment without limiting the scope of the disclosed technology. It will also be appreciated that few of the example block are labeled using numerals (while rest are not shown with labeling) for illustrating blocks such as CUs, PUs, and the like, for the sake of brevity of description, and the same should not be construed as limiting to the scope of the disclosed technology.

The HEVC standard provides various tools for improving coding efficiency in a video encoder. For example, HEVC standard defines a merge mode coding for facilitating reduction in coding processing by allowing an inter-predicted PU to inherit motion data, such as motion vectors, prediction direction, and reference picture indices, from a position selected from neighboring motion data positions in the same picture. Additionally, HEVC standard allows inheriting a temporal motion data position based on a co-located block of the same size as the PU in a reference picture. Also, a skip mode is included as a CU level merge mode with all zero transform coefficients. Regular motion vector coding for inter-prediction of a PU also considers MVs of selected neighboring motion data positions in the same picture and a temporal motion data position derived based on a co-located PU for use as motion vector predictors for the PU.

In a video coding standard such as HEVC, MVs can be transmitted for 5 different block sizes, for example, 64×64, 32×32, 16×16, 8×8 and 4×4. In addition, non-square block sizes are also allowed in HEVC, such as 32×16, 16×32, 8×32, 32×8, 8×16, 4×16, 16×4, and the like. Performing motion estimation for each of the possible PUs to independently determine the best motion vector for each PU may facilitate best possible motion estimation. However, the complexity of performing motion estimation for each PU separately is prohibitive, particularly for embedded solutions. Hence, the motion vectors for different PUs need to be determined without significantly increasing the amount of motion searches.

Pursuant to an exemplary scenario, several applications involving encoding of video data may be associated with determining a decision of modes such as Intra/inter prediction modes, skip mode, merge mode and the like at a CU level. For example, in HEVC, a CU may be further divided into four non-overlapping CUs so that each divided-CU may be coded in one of the intra/inter prediction mode or skip mode or merge mode. Allowing selection of prediction modes for CUs facilitates in a high-quality encoding of pictures. However, a drawback associated with the selection of different prediction modes for each of the CUs is that it increases the complexity of motion estimation mechanism and subsequently that of the encoding process.

Pursuant to an exemplary scenario, a motion estimation mechanism of the video encoder may utilize a tree-block based selection of motion vector prediction for multiple block sizes associated with a LCU in order to achieve an efficient and low complexity motion estimation. An example block diagram illustrating an encoding process is illustrated and explained in detail with reference to FIG. 2.

Figure 2:
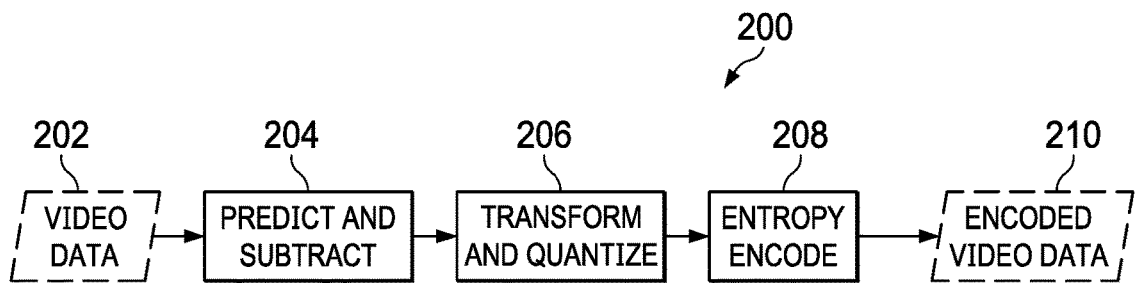
FIG. 2 illustrates a block diagram of an exemplary video encoding paradigm, in accordance with an exemplary scenario.

FIG. 2 illustrates a block diagram providing a simplified overview of encoding of video data 202, in accordance with an exemplary scenario. In particular, FIG. 2 illustrates a simplified overview of an encoding process flow 200 for encoding video data 202 associated with a picture. Pursuant to an exemplary scenario, a video encoder may perform the encoding process flow 200 to achieve the compression of the video data 202. The video data 202 may be compressed so as to efficiently utilize a storage capacity during storage or a spectrum/bandwidth during transmission.

The video encoder may be configured within a multimedia system. Examples of the multimedia system may include, but are not limited to, (1) multimedia devices, such as cellular phones, digital video cameras and digital camcorders; (2) data processing devices, such as personal computers, laptops and personal digital assistants; and (3) consumer electronics, such as set top boxes, digital video disk (DVD) players and video network servers. Pursuant to an exemplary scenario, the video encoder may be any machine capable of executing a set of instructions (sequential and/or otherwise) so as to perform an encoding of video data 202.

The video data 202 may be received by the video encoder from a media capture device. Examples of the media capture device may include a video camera or a camcorder. The media capture device may be, for example, a stand-alone device or a part of a mobile device, such as a Smartphone, or a data processing device, such as a personal computer, a laptop device or a personal digital assistant (PDA). The video data 202 may also be received by the video encoder from a transcoding system (implemented in any of hardware, software or firmware), which may be stand-alone device or a part of media capture device. Examples of video data 202 may include, for example, image data, graphical data, textual data or any combination thereof.

Pursuant to an exemplary scenario, the video data 202 may include a plurality of pictures, and each picture of the plurality of pictures may include rows of video data 202. Each row of video data 202 may include several blocks of data. At 204 of the encoding process flow 200, a prediction for each block from among a number of blocks is determined and subtracted from each block to form a residual video data. The prediction for each block of video data 202 may be performed based on previously encoded blocks of video data 202, either from current picture (e.g., intra prediction) or from other pictures that have already been encoded and transmitted (e.g., inter prediction). Identifying a suitable prediction may be referred to as motion estimation and subtracting the predicted blocks from the current block may be referred to as motion compensation.

After prediction and subtraction, at 206, the residual video data is transformed and quantized. The transformation of the residual video data outputs a set of transform coefficients, each of which is a weighting value for a standard basis pattern. The weighted basis patterns, when combined, are capable of re-creating the residual video data. The set of transform coefficients are then quantized (such as where each coefficient is scaled corresponding to a scale-down factor which may be a mathematical reciprocal of the scale-up factor specified by a multimedia standard, effectively setting a number of transform coefficients to a small value (including zero value)) to achieve compression.

The quantized transform coefficients, along with certain information (for example, information such as: information about the structure of compressed data, information about a complete sequence of video data 202 and/or information that enables a decoder to re-create the prediction), are subject to entropy encoding (e.g., conversion into binary codes using variable length coding and/or arithmetic coding) at 208. The entropy encoding of the quantized transform coefficients produces an efficient, compact binary representation of the information in the form of encoded video data 210. The encoded video data 210 may then be stored and/or transmitted.

In an embodiment, the motion estimation mechanism in the present technology takes into account the motion estimation associated with a merge mode and a skip mode. In merge mode, a candidate list of motion parameters is derived for each of the corresponding PUs. The candidate list includes the motion parameters of spatially neighboring blocks as well as temporally predicted motion parameters that are derived based on the motion data of a co-located block in a reference picture. The chosen set of motion parameters is signalled by transmitting an index into the candidate list. In an exemplary scenario, a merge PU may be considered as a skip PU upon a determination of quantization coefficients to be equal to zero. The coding paradigms such as HEVC allows utilization of multiple merge candidates, while duplicate merge candidates, for example merge candidates having same value of MVs are removed. Additionally, a combination of MVs can be used as a merge candidate. In an example scenario, the maximum number of merge candidates is five.

In order to reduce the complexity of encoding process and maximizing the probability of merge/skip mode during the encoding process, various embodiments of the present technology provide methods and systems for performing motion estimation for one or more merge motion vectors in a merge candidate list. In an example embodiment, a motion search is performed at one or more of the merge candidates, and the results of motion search are compared with the best result obtained with tree-block based motion estimation. If the cost associated with any of the merge candidates is determined to be lower than the tree-block based motion estimation cost, the winning motion vector is set as the winning merge candidate. In alternate embodiments, instead of performing motion search at each of the merge candidates, merge motion estimation is performed only at a sub-set of the PUs. In yet another embodiment, merge candidate motion search may include performing motion search on merge candidates associated with a pruned merge candidate list. In still another embodiment, the merge candidate list may be modified to include merge candidates being rounded-off to integer-pel precision and performing motion estimation by utilizing the modified merge candidate list.

The mechanism of performing motion search for merge candidates and comparing the results with best results of the tree-block based motion estimation to determine the winning motion vector for encoding process is performed at different PU sizes as specified by the HEVC video paradigm. For example, HEVC standard defines five different sizes for PU, namely, 64×64, 32×32, 16×16, 8×8 and 4×4. In addition, non-square PUs are also allowed in HEVC, as already discussed. In HEVC, the MVs associated with the different PUs of a CU may point in different directions, thereby allowing flexibility in the motion estimation process and improving the encoding quality. However, at the same time different MVs pointing in different direction adds to computation complexity in performing motion estimation for each PU separately. The disclosed technology facilitates in determination of the motion vectors for different PUs without significantly increasing the amount of motion searches. Various embodiments of the present technology for encoding a picture are explained herein with reference to FIGS. 2A to 6.

In an example embodiment, the MVs for different PUs may be determined without significantly increasing the amount of motion searches by dividing the process of motion estimation into two stages based on the partitioning of the LCU. In an example embodiment, the LCU (for example, of size 64×64) may be divided into a plurality of equal sized motion estimation regions (MERs) (for example, of size 32×32) each such that in the first stage of motion search, MVs associated with smaller sized plurality of MERs (for example, PUs of size 32×32 or lesser) may be determined while in the second stage the MVs associated with the MERs of larger size (for example, of 64×64 size) may be determined. In an embodiment, one of the MERs associated with the first stage of motion search and second stage of motion search may be utilized for performing encoding. Various stage involved in the motion estimation process based on the present technology is explained further in detail with reference to FIGS. 3A to 3D.

The following description and accompanying figures demonstrate that the present technology may be practiced, or otherwise implemented, in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 3A:
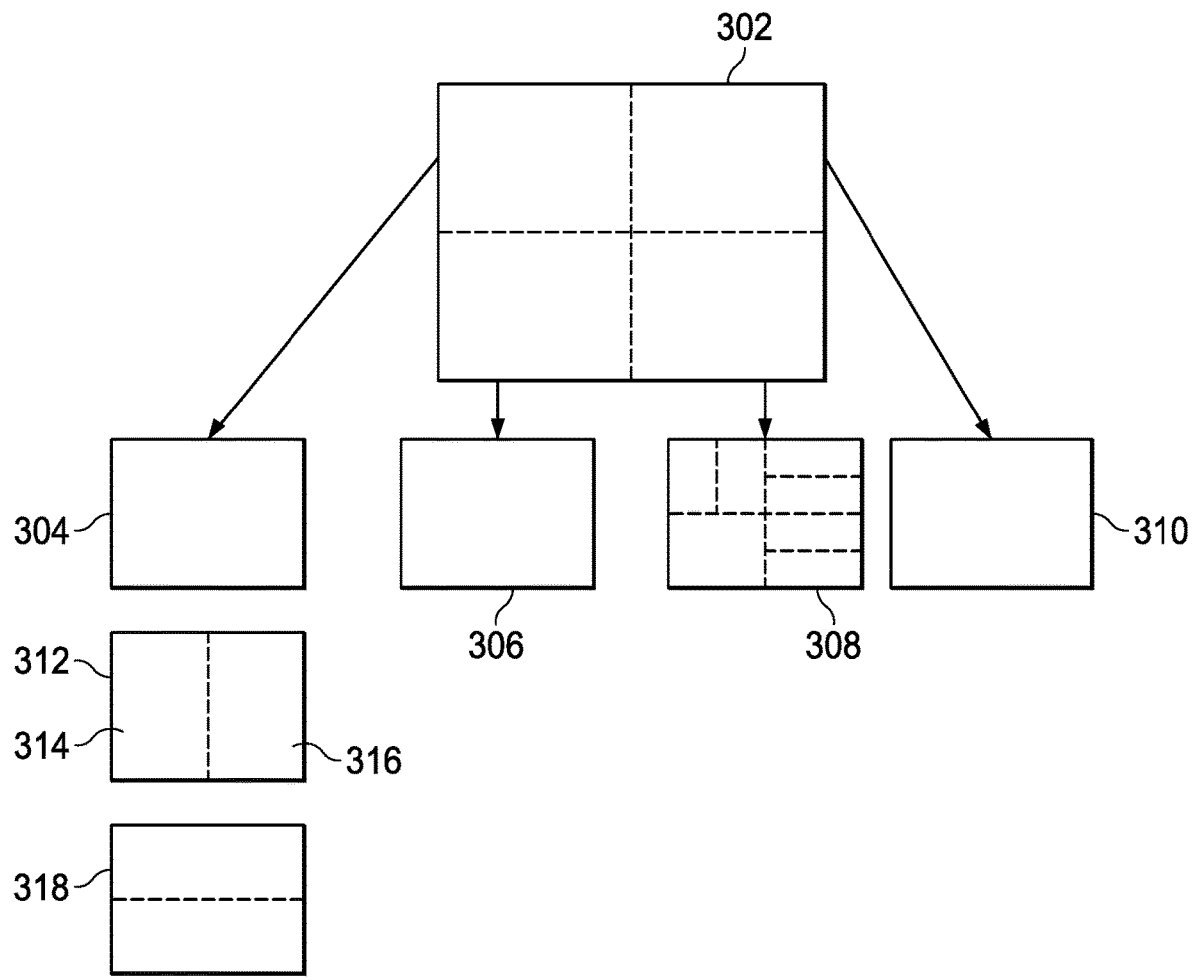
FIGS. 3A through 3D represent various stages in an exemplary motion estimation process during encoding of a picture in accordance with an embodiment.

FIGS. 3A through 3D represent various stages in the process of motion estimation during encoding of the picture in accordance with various embodiments of the present technology. For performing motion estimation in accordance with present technology, an LCU associated with the picture is divided in a quad-tree manner into a plurality of motion estimation regions (MERs). For example, as illustrated in FIG. 3A, the LCU 302 of size 64×64 is divided into a plurality of non-overlapping MERs such as MERs 304, 306, 308, and 310 of equal size. For example, the size of MERs 304, 306, 308, 310 may be 32×32. In an embodiment, one or more MERs from among the plurality of MERs 304, 306, 308, 310 may further be divided into CUs and PUs. For example, one or more MERs may comprise square and non-square inter PUs such as inter PUs, intra PUs, skip mode PU, and the like. The partition of the plurality of MERs may be asymmetric, so the MVs associated with the plurality of PUs may point in different directions.

In an embodiment, one or more first motion searches may be performed for determining MVs associated with the plurality of PUs of each of the MERs. For example, for the MER 312 comprising a first plurality of PUs such as PUs 314, 316, a motion search may be performed for determining a first plurality of MVs associated with the PUs 314, 316. Similarly, an MER 318 comprising the plurality of PUs may have MVs associated therewith.

Figure 3B:
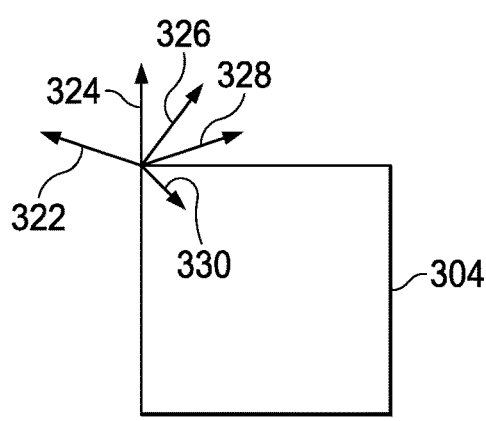

In an embodiment, based on the one or more first motion searches, one or more first quad-trees may be determined based on a cost function associated with the first plurality of PUs. In an embodiment, the one or more first quad-trees may be determined in a manner such that a cost associated with the one or more first quad-trees is minimal as compared to the cost of a plurality of quad-trees associated with the MER 304. In an embodiment, a first motion search of the one or more first motion searches for the first plurality of PUs associated with the MERs, for example, the MER 304 may include a predictor search followed by a refinement search. The predictor search includes determining a first search set comprising a plurality of first MVs associated with the first plurality of PUs. An example of the predictor search is illustrated in FIG. 3B, wherein for a MER for example, an MER 304, a plurality of first MVs such as MVs 322, 324, 326, 328, and 330 are determined. In an example embodiment, the plurality of first MVs may include, but are not limited to MVs from top CUs and left CU from the picture, motion vectors from right, bottom and co-located CUs from previous picture, and the global motion vector. Alternatively or additionally, the plurality of first MVs may include MVs from pre-pass or those associated with lower resolution pictures. Also, MVs from subsequent pictures and/or previous pictures (with restricting to immediate previous picture) can also be utilized in the predictor search.

In an embodiment, a first MV from among the plurality of first MVs is selected. In an embodiment, the first MV may be selected based on the cost function. For example, as illustrated in FIG. 3B, a 32×32 PU may be associated with five different first MVs 322, 324, 326, 328, 330, such as for example, MVs from top and left CUs from current picture, and MVs from right, bottom and co-located CUs from a previous picture. In an embodiment, a first MV having a least cost associated therewith is selected as the first MV from among the plurality of first MVs. In an embodiment, the cost function may be dependent on a distortion factor and a penalty factor. In an example embodiment, the cost function may be expressed by the following expression:

$$\text{Cost} = SATD + \min_{i=1:N}(\text{MVD\_cost\_table}(|MV - AMVP(i)|))$$

where, SAID is sum of absolute transformed differences, MV is the value of motion vector, AMVP is the value of advanced motion vector prediction, and MVD_cost_table refers to a cost table or a list generated based on a difference of the motion vector value and the AMVP value for N-candidates.

In an embodiment, the first MV obtained based on the prediction search may be subjected to the refinement search. In an embodiment, the refinement search comprises performing additional motion searches on a set of search points centered around a search point associated with the first MV. In an example embodiment, refinement search comprises two stages, namely an integer-pel motion search/estimation followed by a fractional-pel motion search/estimation around the position obtained by the integer-pel motion search. As used herein, integer-pel search may refer to a block matching method using sample point integer-pels in a reference picture. Also, fractional pel search may refer to a block matching search method using half-pels and quarter-pels interpolated midway between integer-pels and half-pels, respectively. In an example embodiment, the fractional-pel search comprises a half-pel followed by a quarter-pel. The winning motion vector of the fractional-pel refinement may be the motion vector for 32×32 MER. For performing half-pel search, a fractional-pel search window may include an area bounded by eight neighbor integer-pels positions around the best integer-pel position determined from the integer-pel search. In an embodiment, based on the prediction search and the refinement search, a motion vector and a first quad-tree (or a block-size pattern) is selected that is associated with the lowest cost.

In an embodiment, while performing the motion search for determining one or more first quad-trees, a first candidate list is constructed/generated for storing the first search set and cost information associated with the first plurality of PUs of the first search set. An example of first candidate list for a 32×32 PU may include entries as depicted below:

Best_entry_32×32[0]
Best_entry_32×16[0, 1]
Best_entry_16×32 [0, 1]
Best_entry_8×32[0, 1, 2, 3]
Best_entry_32×8[0, 1, 2, 3]
Best_entry_16×16[0, 1, 2, 3]
Best_entry_16×8[0, 1, 2, . . . , 6, 7]
Best_entry_8×16[0, 1, 2, . . . , 6, 7]
Best_entry_4×16[0, 1, 2, . . . , 14, 15]
Best_entry_16×4[0, 1, 2, . . . , 14, 15]
Best_entry_8×8[0, 1, 2, . . . 14, 15]

In an embodiment, the first candidate list may be updated during the one or more first motion searches, for example, during a 32×32 motion search upon determination of the cost associated with a PU being lower than a corresponding stored value in the first candidate list. In an embodiment, at the end of the number of first motion searches, for example 32×32 search, MVs for all the PUs from 8×8 to 32×32 are obtained. It will be appreciated that for determining motion vectors and costs for PUs smaller than 32×32, no additional distortion computation (for example, SAD computation or SATD computation) is required, as the intermediate values for the smaller PUs is computed as part of distortion computation for the 32×32 block. The intermediate values for the motion vectors are stored and updated for updating the first candidate list. Hence, the complexity of the proposed motion estimation is comparable to motion estimation schemes used for other video paradigms (e.g. H.264, MPEG-4).

Figure 3C:
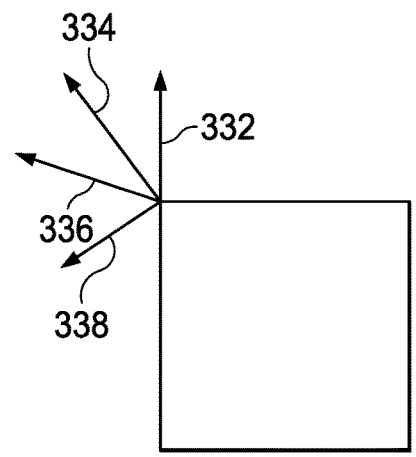

In an embodiment, upon performing the first motion estimation for all the four constituent 32×32 PUs, a number of second motion searches are performed for the 64×64 PU. In an embodiment, a second quad-tree may be determined based on the cost function associated with a second plurality of PUs of the LCU. In an embodiment, the second plurality of PUs comprises the first plurality of PUs having size greater than the predetermined size. For example, the 64×64 PU includes four 32×32 PUs. The second motion search is performed for the 64×64 PU at the winning motion vectors from the four 32×32 PUs, for example, MVs 332, 334, 336, 338 as illustrated in FIG. 3C. In an embodiment, the term 'winning motion vector' may refer to the MVs associated with a least cost. In an embodiment, the number of second motion searches are performed for determining a second quad-tree. In an embodiment, the second motion search for 64×64 PU may further include a refinement search. In an embodiment, the refinement search may include a sub-pel refinement on a set of search points centered around a search point associated with the winning motion vector of the second plurality of PUs to generate a second MV. Accordingly, the second motion vector is the motion vector for 64×64 motion search.

In an embodiment, while performing the second set of motion searches, a second plurality of MVs associated with other non-square PUs in the 64×64 PU may be generated. In an embodiment, the second plurality of MVs may be stored in a memory. In an embodiment, a second candidate list may be generated/constructed for storing the second plurality of MVs along with the information associated with the second plurality of PUs. For example, the second candidate list may include, for each PU of the second plurality of PUs, motion vectors associated with the each PU, and the cost for the each PU. In an embodiment, the cost for the each PU may include, for example a rate distortion component (for example, SAD/SATD), and a motion vector penalty factor. An example second candidate list for a 64×64 PU may include entries as depicted below:

Best_entry_64×64[0]
Best_entry_64×32[0, 1]
Best_entry_32×64[0, 1]
Best_entry_16×64[0, 1, 2, 3]
Best_entry_64×16[0, 1, 2, 3]
Best_entry_32×32[0, 1, 2, 3]
Best_entry_32×16[0, 1, 2, . . . , 6, 7]
Best_entry_16×32[0, 1, 2, . . . , 6, 7]
Best_entry_8×32 [0, 1, 2, . . . 15]
Best_entry_32×8[0, 1, 2, . . . , 15]
Best_entry_16×16[0, 1, 2, . . . 14, 15]

In an embodiment, the motion information stored in the first candidate list and the second candidate list may be utilized for performing encoding of the picture. For example, a cost of the one or more first quad-trees is compared with the cost of the second quad-tree based on the motion information associated with the first plurality of MVs and the second plurality of MVs, and an associated cost information stored in the first candidate list and the second candidate list, respectively. For example, the cost associated with the first candidate list may be a first cost while the cost associated with the second candidate list may be a second cost. In an embodiment, based on the comparison, a quad-tree from among the one or more first quad-trees and the second quad-tree may be selected based on the comparison of the first cost and the second cost. For example, the quad-tree may be selected by comparing the first cost associated with a PU in the first quad-tree with a second cost associated with a corresponding PU in the second quad-tree. In an embodiment, the quad-tree may be selected based on the determination of lower of the first cost and the second cost, and the selected quad-tree may be utilized for performing encoding of the LCU in the picture.

Figure 3D:
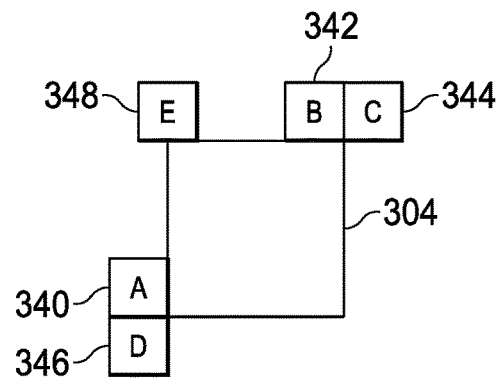

In an embodiment, encoding may be performed based on a determination of a merge candidate list associated with one or more PUs of the first plurality of PUs and the second plurality of PUs. In an embodiment, the merge candidate list may be generated for each of the first plurality of PUs and the second plurality of PUs. As used herein, the merge candidate list may be associated with a merge mode. In merge mode a candidate list of motion parameters is derived for the corresponding PU. The merge candidate list includes the motion parameters of spatially neighboring blocks as well as temporally predicted motion parameters that are derived based on the motion data of a co-located block in a reference picture. The chosen set of motion parameters is signalled by transmitting an index into the merge candidate list. Accordingly, in merge mode, the encoder instructs a decoder to copy motion vector information from a selected candidate motion vector for a current portion of the picture/frame. Various merge candidates for a PU are illustrated with reference to FIG. 3D. For example, FIG. 3D illustrates merge candidates 340, 342, 344, 346, 348 associated with the MER 304. In an example scenario, when all the coefficients after quantization are determined to be zero, then the merge PU becomes a skip PU.

In an embodiment, a third motion search may be performed at one or more merge MV candidates associated with one or more PUs from among the first and second plurality of PUs. For the one or more PUs, a plurality of third MVs is determined based on the cost function. In an embodiment, the plurality of third MVs may include those merge candidate MVs (corresponding to the each PU) that are associated with the least cost. In an embodiment, for each of the one or more PUs, a MV from among the third MV and the corresponding first and second plurality of MVs is selected based on a comparison of the third MV with the corresponding first and second plurality of MVs.

In an embodiment, for determination of third MVs from the merge candidate list, the third motion search is performed only at a sub-set of the first and second plurality of PUs, thereby facilitating in reduction of computational complexity associated with performing merge candidate list motion estimation at all the PUs. In yet another embodiment, determination of third MVs is carried out by pruning the merge candidate list and motion estimation may be carried out only on the pruned merge candidate list. In an embodiment, the pruned merge candidate list may include only a selected number of merge candidates associated with the one or more PUs. It will be appreciated that performing motion estimation only on the pruned merge candidate list has the advantage of reduction in computational complexity associated with the motion estimation process. In still another embodiment, determination of third MVs is performed by constructing an integer-pel candidate list, and determining the one or more merge candidates from the integer-pel candidate list. As disclosed herein, the integer-pel candidate list is constructed by rounding-off the one or more merge candidates associated with a fractional-pel position to a nearest integer-pel search positions. An advantage of performing the third motion search at the candidates of the integer-pel candidate list is that the computational complexity associated with the third motion estimation is reduced, thereby resulting in bit-rate reduction and PSNR improvement. An example system for implementing the disclosed technology for performing encoding in a picture is illustrated and explained further with reference to FIG. 4.

Figure 4:
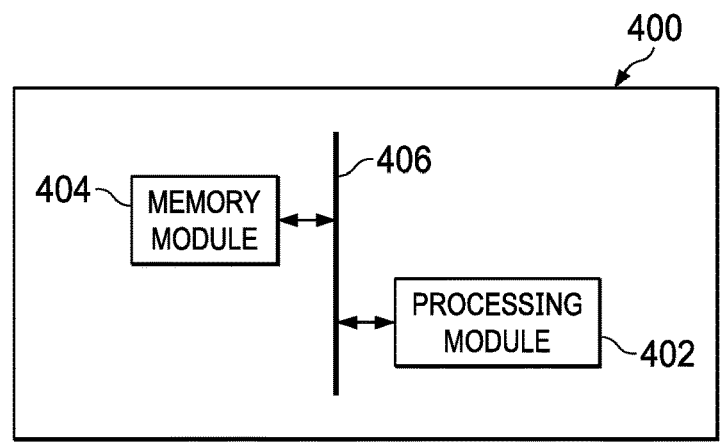
FIG. 4 is a block diagram of an exemplary LCU processing system for a video encoder, in accordance with an embodiment.

FIG. 4 is a block diagram of an exemplary LCU processing system 400 for a video encoder, in accordance with an embodiment. In an embodiment, the LCU may be associated with a picture. The picture may include, for example, frames, fields, and the like. Furthermore, the picture may be associated with various video content types, such as, for example, progressive video content, interlaced video content, and the like. In an embodiment, the system 400 is configured to be included within a video encoder. Examples of the video encoder may include a HEVC based encoder. In an exemplary embodiment, the system 400 may be configured within a personal computer (PC), a tablet PC, a personal digital assistant (PDA), a mobile communication device, a web appliance, a set-top box (STB), an embedded system and/or any machine capable of executing a set of instructions (sequential and/or otherwise) so as to perform encoding of pictures.

In an embodiment, the system 400 includes a processing module 402 and a memory module 404, wherein the processing module 402 may be referred to, for example, as an encoding device or module. In an embodiment, the memory module 404 is communicatively associated with the processing module 402. In an embodiment, the processing module 402 and the memory module 404 are configured to communicate with each other via or through a bus 406. Examples of the bus 406 may include, but are not limited to, a data bus, an address bus, a control bus, and the like. The bus 406 may be, for example, a serial bus, a bi-directional bus or a unidirectional bus.

In an embodiment, the processing module 402 may be embodied as a multi-core processor, a single core processor, or a combination of one or more multi-core processors and one or more single core processors. For example, the processing module 402 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 402 may be configured to execute hard-coded functionality. In an embodiment, the processing module 402 is embodied as an executor of software instructions, wherein the instructions may specifically configure the processing module 402 to perform the algorithms and/or operations described herein when the instructions are executed. The processing module 402 may include, among other things, a clock, an arithmetic logic unit (ALU) and logic gates configured to support an operation of the processing module 402. Examples of the memory module 404 may include, but are not limited to, a random access memory (RAM), a dual port RAM, a synchronous dynamic RAM (SDRAM), a double data rate SDRAM (DDR SDRAM), and the like.

In an embodiment, the processing module 402 is configured to divide the LCU into a plurality of equal sized MERs, wherein size of the plurality of MERs is equal to or less than a predetermined size. For example, the processing module 402 may divide the 64×64 LCU into four equal non-overlapping MERs of size 32×32 each. The processing module 402 is further configured to perform a motion searches for determining a first plurality of MVs for the 32×32 MERs. In an embodiment, the processing module 402 is configured to perform the motion searches in two stages. For example, in the first stage the processing module 402 is configured to perform a number of first motion searches to determine a motion vectors for PUs equal and smaller than the predetermined size, while in the second stage the processing module 402 is configured to perform a number of second motion searches to determine motion vectors for PUs greater than the predetermined size. In an embodiment, based on the number of first motion searches, the processor is configured to determine a first MV from among the set of first MVs.

In an embodiment, a first motion search of the number of first motion searches for the first plurality of PUs associated with the MER may include a predictor search followed by a refinement search. In an embodiment, the predictor search includes determining a first search set comprising a plurality of first MVs associated with the first plurality of PUs. In an embodiment, a first MV from among the plurality of first MVs is selected. In an example embodiment, the most suitable MV (or the first MV) associated with each of the 32×32 MER may be determined as winning MVs for said 32×32 MER. In an embodiment, the most suitable MV (or the first MV) may be determined by performing a motion vector prediction search for the plurality of MVs based on the cost function. In an embodiment, the motion vector prediction search may be performed for the motion vector predictors selected from a top CU and a left CU from the current picture; and motion vector predictors from the right, bottom and co-located CUs from previous picture. In an embodiment, the processing module 402 is configured to compute the cost of motion vector predictors associated with motion vector prediction search. As already discussed, the cost of the motion vector prediction may be determined based on a motion vector penalty component and a distortion component. In an example embodiment, the cost of MV prediction may be given by the following expression:

$$\text{Cost} = SATD + \min_{i=1:N} (\text{MVD\_cost\_table}(|MV - AMVP(i)|))$$

where, SATD is sum of absolute transformed differences
MV is the value of motion vector
AMVP is the value of advanced motion vector prediction
MVD_cost_table refers to a cost table or a list generated based on a difference of the motion vector value and the AMVP value for N-candidates.

In an example embodiment, the AMVP list may include N-candidates. In an embodiment, the processing module 402 may be configured to compute the motion vector difference (MVD) cost for N-candidates. In an embodiment, since the value of SATD is same for all the candidates, the processing module 402 may compute the penalty for all candidate motion vectors for determining the associated cost. In an embodiment, the memory module 404 is configured to store the generated AMVP candidate list, and provide the same to the processing module 402 for computation of the cost. In an embodiment, the processing module 402 is configured to determine the MVP candidate associated with the lowest cost. In an embodiment, the MVP candidate or the motion vector predictor associated with least cost may be determined as a first MV.

In an embodiment, the processing module 402 is configured to perform a refinement search on the first MV obtained from the prediction search. In an embodiment, the refinement search comprises performing additional motion searches on a set of search points centered around a search point associated with the first MV. In an example embodiment, the refinement search comprises an integer-pel motion search/estimation followed by a fractional-pel motion search/estimation around the position obtained by the integer-pel motion search.

In an embodiment, the processing module 402 is configured to construct a first candidate list while performing the number of first motion searches for the one or more first quad-trees. In an embodiment, the first candidate list includes the first search set and cost information associated with the first plurality of PUs of the first search set. In an embodiment, the memory module 404 is configured to store the first candidate list. In an embodiment, the first candidate list may be updated during the number of first motion searches, for example, during a 32×32 search upon determination of the cost associated with a PU being lower than a corresponding stored value in the first candidate list. In an embodiment, the updated first candidate list is stored in the memory module 404.

In an embodiment, the processing module 402 is further configured to perform the second motion search for the 64×64 PU, and determine a second quad-tree based on the number of second motion searches. In an example embodiment, the number of second motion searches may include a single motion search only. For example, when the size of the second PUs is equal to the LCU (for example, 64×64), then only a single second motion search is performed. For example, the 64×64 PU includes four 32×32 PUs, and the second motion search is performed for the 64×64 PU at the winning motion vectors from the four 32×32 PUs. In an embodiment, the processing module 402 is configured to determine the second quad-tree based on the cost function associated with a second plurality of PUs of the LCU. In some embodiments, determination of the second quad-tree may be construed as referring to a determination of winning MVs associated with various partitions of the LCU. For example, in the present embodiment wherein the size of the LCU is 64×64, the determination of the second quad-tree may be construed as referring to determination of MVs for the 32×32 PUs, and selecting one MV from among the four MVs associated with the four 32×32 as the winning MV. In an embodiment, the winning MV may be selected based on a cost function. For example, for selection of the winning MV, a cost associated with the four MVs associated with 32×32 PUs may be determined and compared. The MV associated with the least cost may be selected as the winning MV.

In an embodiment, the processing module 402 is configured to perform the second motion search for 64×64 PU by performing a refinement search on a set of search points centered around a search point associated with the winning motion vector of the second plurality of PUs to generate a second MV. For example, the refinement search may include a sub-pel refinement. Accordingly, the second motion vector is the winning motion vector (or second MV) for 64×64 motion search. In an embodiment, the processing module 402 is configured to construct a second candidate list while performing the second motion search. In an embodiment, the second candidate list includes a second plurality of MVs associated with other square and non-square PUs in the 64×64 PU, and cost information associated with the MVs of the second plurality of PUs. In an embodiment, the memory module 404 is configured to store the generated second candidate list.

In an embodiment, the processing module 404 is configured to perform encoding of the picture based on the motion information stored in the first candidate list and the second candidate list. For example, the processing module 404 is configured to compare a first cost (associated with the one or more first quad-trees) with a second cost (associated with the second quad-tree based on the motion) stored in the first candidate list and the second candidate list respectively, and based on the comparison, a quad-tree from among the first quad-tree or the second quad-tree may be selected. In an embodiment, the quad-tree may be configured to facilitate in performing encoding associated with the LCU in the picture.

In an embodiment, the processing module 404 is configured to perform encoding based on a determination of merge candidates associated with one or more PUs of the first plurality of PUs and the second plurality of PUs. In an embodiment, the processing module 404 is configured to determine a merge candidate list comprising a plurality of merge MV candidates associated with one or more PUs. In an embodiment, the one or more PUs may be determined from among the first plurality of PUs and the second plurality of PUs.

Various merge candidates for a PU are illustrated with reference to FIG. 3D. In an embodiment, a third motion search may be performed at the one or more merge MV candidates from among the plurality of MV candidates so as to determine a plurality of third MVs. In an embodiment, the plurality of third MVs are determined based on the cost function associated with the one or more MV merge candidates. In an embodiment, the plurality of third MVs is determined based on the cost function. In an embodiment, the plurality of third MVs may include those merge candidate MVs (corresponding to the each PU) that are associated with the least cost. In an embodiment, for each of the one or more PUs, a MV from among the third MVs and the corresponding first and second plurality of MVs is selected based on a comparison of the cost associated with third MVs and the cost associated with the corresponding first and second plurality of MVs.

In an embodiment, for performing determination of third MVs from the merge MV candidate list, the processing module 404 is configured to perform the third motion search only at a sub-set of the first and second plurality of PUs, thereby facilitating in reduction of computational complexity associated with performing merge candidate list motion estimation at all the PUs. In another embodiment, the processing module 404 is configured to construct a pruned merge MV candidate list, and perform motion estimation only on the pruned merge MV candidate list. In an embodiment, the pruned merge candidate list is constructed by pruning the merge candidate list. It will be appreciated that performing motion estimation only on the pruned merge candidate list has the advantage of reduction in computational complexity associated with the motion estimation process. In yet another embodiment, the one or more merge MV candidates comprises candidates of a modified merge MV candidate list. In an embodiment, the modified merge candidate MV list is constructed by rounding-off the one or more merge candidates associated with fractional-pel search positions in the merge candidate list to corresponding nearest integer-pel search positions for performing the third motion search.

In an embodiment, the system 400 additionally includes components, such as an input unit (e.g., an image processing device), a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is configured to transfer the video data to the processing module 402 for processing of the video data. The drive unit includes a machine-readable medium upon which is stored one or more sets of instructions (e.g., software) embodying one or more of the methodologies and/or functions described herein. In an embodiment, the software resides, either completely or partially, within the memory module 404 and/or within the processing module 402 during the execution thereof by the system 400, such that the memory module 404 and processing module 402 also constitute a machine-readable media. The software may further be transmitted and/or received over a network via the network interface unit.

The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions for execution by the system 400 and that cause the system 400 to perform any one or more of the methodologies of the various embodiments. Furthermore, the term "machine-readable medium" may be construed to include, but shall not be limited to, solid-state memories, optical and magnetic media, and carrier wave signals. An example method of performing encoding is explained in detail with reference to FIG. 5.

Figure 5:
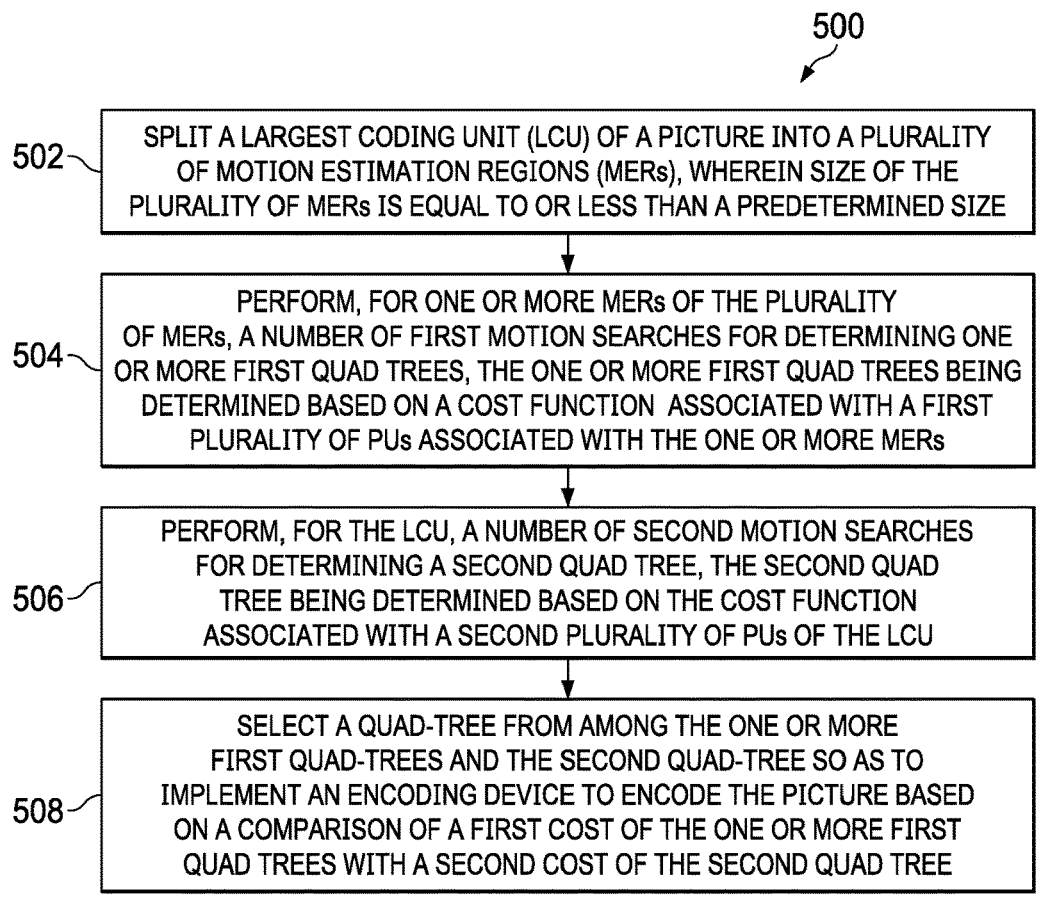
FIG. 5 is a flow diagram of a method of encoding of a picture associated with video data, in accordance with an embodiment.

FIG. 5 is a flow diagram of a method 500 for encoding pictures associated with video data, in accordance with an embodiment. The method 500 depicted in flow diagram may be executed by, for example, the system 400 of FIG. 4. Operations of the flowchart, and combinations of operation in the flowchart, may be implemented by various means, such as hardware, firmware, processor, circuitry and/or other device associated with execution of software including one or more computer program instructions. The operations of the method 500 are described with help of the system 400. However, the operations of the method can be described and/or practiced by using any other system.

Various embodiments of method 500 facilitate in reduction of the number of motion searches and distortion computations being performed for motion estimation in pictures. In various embodiments, method 500 discloses performing motion estimation for MERs (for example, PUs) having size smaller than or equal to a predetermined size, and using book keeping to determine best MVs for such PUs. For PUs larger than the predetermined size, only refinement search may be performed instead of complete motion search to determine the best MV associated with the larger PUs.

The method 500 starts at operation 502. At operation 502, an LCU of the picture is divided into a plurality of MERs such that the size of each of the plurality of MERs is equal to or less than a predetermined size. In an embodiment, the predetermined size associated with the plurality of PUs may be 32×32. In an embodiment, the dividing of the LCU is performed by a processing module (for example, the processing module 402 of FIG. 4).

At operation 504, for one or more MERs from among the plurality of MERs, a number of first motion searches are performed to determine one or more first quad-trees. In an embodiment, the number of first motion searches is performed by a processing module (for example, the processing module 402 of FIG. 4). In an embodiment, a first motion search of the number of first motion searches may include a predictor search followed by a refinement search. For example, in an embodiment, the predictor search may include determining a first search set comprising a plurality of first MVs associated with the first plurality of PUs.

In an embodiment, a first MV from among the plurality of first MVs is selected based on a cost function. In an embodiment, the cost function may include a rate distortion component and a motion vector penalty component. In an embodiment, the rate distortion component may be determined based on SAD or SATD. In an embodiment, the motion vector penalty component added to the rate distortion component may be determined based on an AMVP candidate associated with a lowest penalty. For example, the AMVP candidate list may include N-candidates. In an embodiment, MVD cost for all candidates may be computed and the candidate having the lowest cost may be utilized for determining the motion vector penalty.

In an embodiment, the refinement search comprises performing additional motion searches on the first MV, wherein each of the additional motion search is performed on a set of search points centered around a search point associated with the first MV. In an example embodiment, the additional motion searches may include fractional-pel searches that may be performed for determination of the one or more first quad-trees. In an embodiment, while performing the number of first motion searches for the one or more first quad-trees, a first candidate list may be constructed such that the first candidate list includes plurality of first MVs associated with the first plurality of PUs and inter-cost information associated with the first plurality of PUs. In an embodiment, the first candidate list may be updated during a motion search, for example, during a 32×32 search upon determination of the cost associated with a PU being lower than a corresponding stored value in the first candidate list.

At operation 506, for the LCU, a number of second motion searches are performed to determine a second quad-tree. In an embodiment, the number of second motion searches may include a single second motion search. For example, the 64×64 PU includes four 32×32 PUs. The second motion search is performed for the 64×64 PU at the winning motion vectors from the four 32×32 PUs. In an embodiment, the second quad-tree is determined based on the cost function associated with a second plurality of PUs of the LCU. In an embodiment, the second motion search is performed for 64×64 PU by performing a refinement search on a set of search points centered around a search point associated with the winning motion vector of the second plurality of PUs to generate a second MV. In an embodiment, the number of second motion searches is performed by a processing module (for example, the processing module 402 of FIG. 4).

In an embodiment, a second candidate list is constructed while performing the second motion search. In an embodiment, the second candidate list includes a second plurality of MVs associated with other non-square PUs in the 64×64 PU, and cost information associated with the MVs of the second plurality of PUs.

At operation 508, one first quad-tree from among the one or more first quad-trees or the second quad-tree is selected for performing encoding of the picture based on a comparison of a first cost of the one or more first quad-trees with a second cost of the second quad-tree. In an embodiment, encoding may be performed based on a determination of merge candidates associated with one or more PUs of the first plurality of PUs and the second plurality of PUs. The generation of the merge candidate list is explained with reference to FIG. 3C. In an embodiment, a third motion search may be performed at one or more merge candidates associated with one or more PUs from among the first and second plurality of PUs. For the one or more PUs, a plurality of third MVs is determined based on the cost function. In an embodiment, the plurality of third MVs may include those merge candidate MVs (corresponding to the each PU) that are associated with the least cost. In an embodiment, for each of the one or more PUs, a MV from among the third MV and the corresponding first and second plurality of MVs is selected based on a comparison of the third MV with the corresponding first and second plurality of MVs.

In an embodiment, for determination of third MVs from the merge candidate list, the third motion search is performed only at a sub-set of the first and second plurality of PUs, thereby facilitating in reduction of computational complexity associated with performing merge candidate list motion estimation at all the PUs. In another embodiment, determination of third MVs is carried out by pruning the merge candidate list and motion estimation may be carried out only on the pruned merge candidate list. It will be appreciated that performing motion estimation only on the pruned merge candidate list has the advantage of reduction in computational complexity associated with the motion estimation process. The method of encoding pictures disclosed herein facilitates in achieving significant bitrate reduction and video quality improvement over previous encoders.

Figure 6:
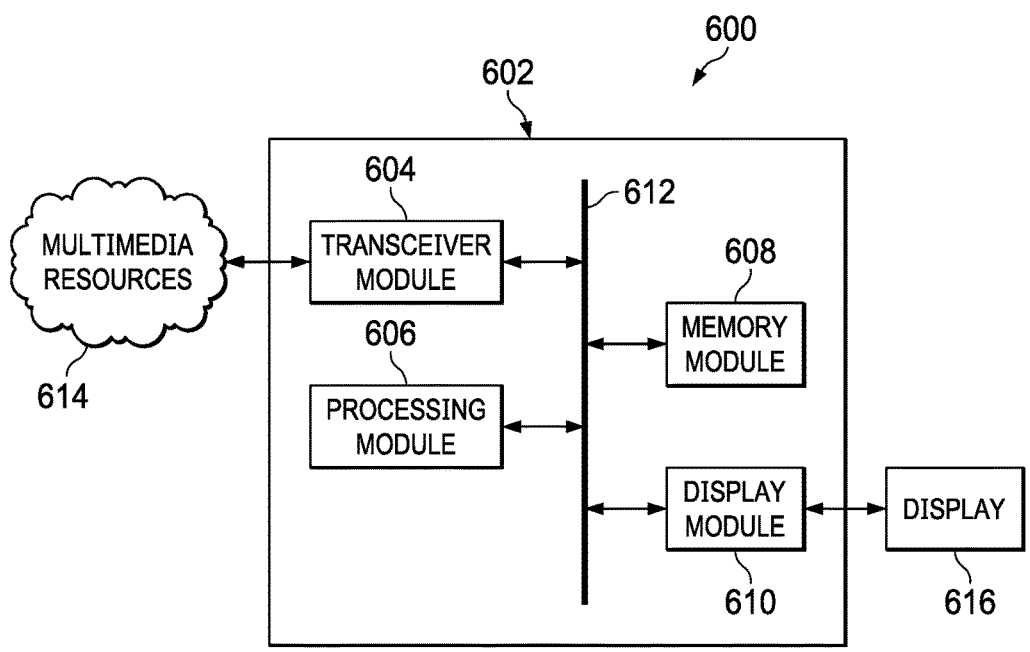
FIG. 6 is a block diagram of an integrated circuit configured to encode pictures associated with video data, in accordance with an embodiment.

FIG. 6 is a block diagram of an exemplary encoding paradigm 600 in accordance with an embodiment. In particular, an integrated circuit 602 configured to encode pictures associated with video data, in accordance with an embodiment is shown. In an embodiment, the system 400 of FIG. 4 may be embodied at least partially in form of the integrated circuit 602. The integrated circuit 602 comprises a transceiver module 604, a processing module 606, a memory module 608 and a display module 610. The transceiver module 604, the processing module 606, the memory module 608 and the display module 610 are communicatively associated or coupled with each other using data path 612. As such, it should be appreciated that at least some of the components described below in connection with the integrated circuit 602 may be optional and thus in an example embodiment the integrated circuit 602 may include more, less or different components than those described in connection with the example embodiment of FIG. 6. In an embodiment, the integrated circuit 602 may include only the processing module 606 and the memory module 608.

The transceiver module 604 is communicatively associated or coupled with a plurality of multimedia resources 614 and is configured to receive pictures associated with video data from one or more multimedia resources from among the plurality of multimedia resources 614. Examples of the multimedia resources may include, but are not limited to (1) remote multimedia systems (2) media capture devices, such as, for example, a camera, camcorders and the like, and (3) multimedia storage devices, such as, for example, magnetic tapes, disks, computer-readable media and the like. In an embodiment, the transceiver module 904 may include an antenna and/or network connectors configured to coupled with or connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port and the like.

The processing module 606 is configured to perform encoding of pictures associated with the video data. In an embodiment, the processing module 906 may be configured to encode the video data and provide the video data to transceiver module 604 for transmission purposes or to memory module 608 for storage purposes. In an embodiment, the processing module 606 may be substantially similar to processing module 402 of system 400 of FIG. 4. The processing module 606 is configured to perform functions as discussed in FIG. 2, which are not repeated herein for the sake of brevity.

The memory module 608 is configured to store the video data subsequent to encoding of the video data. In an embodiment, the memory module 608 may be substantially similar to the memory module 404 of system 400 of FIG. 4. The memory module 908 is configured to perform functions as discussed in FIG. 4, which are not repeated herein for the sake of brevity. Examples of memory module 608 may include, but are not limited to, RAM, dual port RAM, SDRAM, DDR SDRAM, and the like. The display module 610 is configured to facilitate a display of the video data on display 616. The display 616 may be facilitated, for example, in response to a user input received using a user interface (not shown in FIG. 6). Examples of display 616 may include a light crystal display (LCD) panel, a plasma display panel, a field emission display and the like.

In an embodiment, the integrated circuit 602 may be an application processor chip. In an embodiment, the integrated circuit 602 may be a part of a particular or shared processor chip that is embedded within a multimedia system. Examples of the multimedia system may include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers.

Without in any way limiting the scope, interpretation, or application of the claims appearing below, advantages of one or more of the exemplary embodiments disclosed herein include minimization of the number of motion estimation searches and rate distortion computations being performed for motion estimation. In various embodiments, the proposed technology facilitates in performing motion estimation at smaller sized PUs, and using book keeping to determine the best motion vectors for smaller PUs (for example, smaller than or equal to 32×32). For greater size PUs, such as for example, PUs larger than 32×32 only refinement search is performed to find the best motion vector, thereby reducing the computation complexity of motion estimation mechanism.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 400, the processing module 402 and the memory module 404 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method for encoding a picture, the method comprising:
dividing a coding unit (CU) of the picture into a first motion estimation region (MER) and a second MER, the CU larger in size than the first MER and the second MER;

performing a first motion search for the first MER and the second MER to determine a first motion vector (MV) for the first MER and a second MV for the second MER, wherein:
the first motion search is based on a first cost to predict the first MV and a second cost to predict the second MV;
the first motion search for the first MER includes a first predictor search, a first integer-pel search, and a first fractional-pel search based on a first set of search points of the first MV;
the first fractional-pel search includes an area bounded by eight neighbor integer-pel positions around a best integer-pel position determined from the first integer-pel search; and
the first cost and the second cost are determined based on a penalty component and a distortion component;
performing a second motion search for the CU to determine a selected MV from one of the first MV and the second MV based on which one of the first cost and the second cost is lower;
performing a sub-pel refinement using the selected MV to determine a refined MV; and
encoding the CU in the picture using the refined MV.

2. The method of claim 1, wherein performing the first motion search includes:
determining a first search set including the first MV, a third MV, and a fourth MV associated with the first MER; and
selecting the first MV from among the first MV, the third MV, and the fourth MV based on the first cost, a third cost to predict the third MV, and a fourth cost to predict the fourth MV.

3. The method of claim 2, further including:
generating a first candidate list including the first search set and inter-cost information of the first search set; and
updating the first candidate list in response to the first motion search.

4. The method of claim 1, wherein performing the second motion search includes:
determining a second search set including the first MV and the second MV; and
selecting the selected MV from among the first MV and the second MV.

5. The method of claim 4, further including:
generating a second candidate list including the second search set and inter-cost information of the second search set; and
updating the second candidate list in response to the second motion search.

6. A system comprising:
a processor configured to:
divide a coding unit (CU) of a picture into a first motion estimation region (MER) and a second MER, the CU larger in size than the first MER and the second MER;
perform one or more first motion searches for the first MER and the second MER to determine a first motion vector (MV) for the first MER and a second MV for the second MER, wherein:
the one or more first motion searches are based on a first cost to predict the first MV and a second cost to predict the second MV;
the one or more first motion searches includes a first predictor search, a first integer-pel search, and a first fractional-pel search based on a first set of search points of the first MV;
the first fractional-pel search includes an area bounded by eight neighbor integer-pel positions around a best integer-pel position determined from the first integer-pel search; and
the first cost and the second cost are determined based on a penalty component and a distortion component;
perform one or more second motion searches for the CU to determine a selected MV from one of the first MV and the second MV based on which one of the first cost and the second cost is lower;
perform a sub-pel refinement using the selected MV to determine a refined MV; and
encode the CU in the picture using the refined MV; and
memory communicatively associated with the processor and configured to store a first candidate list generated based on a first number of the one or more first motion searches and a second candidate list generated based on a second number of the one or more second motion searches.

7. The system of claim 6, wherein the processor is configured to:
determine a first search set including the first MV, a third MV, and a fourth MV associated with the first MER; and
select the first MV from among the first MV, the third MV, and the fourth MV based on the first cost, a third cost to predict the third MV, and a fourth cost to predict the fourth MV.

8. The system of claim 7, wherein the processor is configured:
generate the first candidate list including the first search set and inter-cost information of the first search set; and
update the first candidate list in response to the one or more first motion searches.

9. The system of claim 6, wherein the processor is configured to:
determine a second search set including the first MV and the second MV; and
select the selected MV from among the first MV and the second MV.

10. The system of claim 9, wherein the processor is further configured to:
generate the second candidate list including the second search set and inter-cost information of the second search set; and
update the second candidate list in response to the one or more second motion searches.

11. A non-transitory computer readable medium storing a set of instructions that when executed cause a computer to at least:
divide coding unit (CU) of a picture into a first motion estimation region (MER) and a second MER, the CU larger in size than the first MER and the second MER;
perform a first motion search for the first MER and the second MER to determine a first motion vector (MV) for the first MER and a second MV for the second MER, wherein:
the first motion search is based on a first cost to predict the first MV and a second cost to predict the second MV;
the first motion search for the first MER includes a first predictor search, a first integer-pel search, and a first fractional-pel search based on a first set of search points of the first MV;

the first fractional-pel search includes an area bounded by eight neighbor integer-pel positions around a best integer-pel position determined from the first integer-pel search; and the first cost and the second cost are determined based on a penalty component and a distortion component; and perform a second motion search for the CU to determine a selected MV from one of the first MV and the second MV based on which one of the first cost and the second cost is lower;

perform a sub-pel refinement using the selected MV to determine a refined MV; and encode the CU in the picture using the refined MV.

12. The non-transitory computer readable medium of claim 11, wherein the instructions cause the computer to:
determine a first search set including the first MV, a third MV, and a fourth MV associated with the first MER; and
select the first MV from among the first MV, the third MV, and the fourth MV based on the first cost, a third cost to predict the third MV, and a fourth cost to predict the fourth MV.

13. The non-transitory computer readable medium of claim 12, wherein the instructions cause the computer to:
generate a first candidate list including the first search set and inter-cost information of the first search set; and
update the first candidate list in response to the first motion search.

14. The non-transitory computer readable medium of claim 11, wherein the instructions cause the computer to:
determine a second search set including the first MV and the second MV; and
select the selected MV from among the first MV and the second MV.

15. The non-transitory computer readable medium of claim 14, wherein the instructions cause the computer to:
generate a second candidate list including the second search set and inter-cost information of the second search set; and
update the second candidate list in response to the second motion search.

16. The method of claim 1, wherein:
the first cost is determined based on a first motion vector penalty component and a first distortion component; and
the second cost is determined based on a second motion vector penalty component and a second distortion component.

17. The system of claim 6, wherein:
the first cost is determined based on a first motion vector penalty component and a first distortion component; and
the second cost is determined based on a second motion vector penalty component and a second distortion component.

18. The non-transitory computer readable medium of claim 11, wherein:
the first cost is determined based on a first motion vector penalty component and a first distortion component; and
the second cost is determined based on a second motion vector penalty component and a second distortion component.

19. The method of claim 1, wherein the first fractional-pel search includes a block matching search using half-pels and quarter-pels interpolated midway between integer-pels and half-pels, respectively.

20. The method of claim 1, wherein performing the sub-pel refinement is based on a third set of search points around the selected MV to determine the refined MV.

* * * * *